March 26, 1957 — F. P. ELLZEY — 2,786,435
METHOD OF MAKING A SPIRALLY WRAPPED MULTI-LAYER TUBE
Original Filed June 24, 1946 — 4 Sheets-Sheet 1
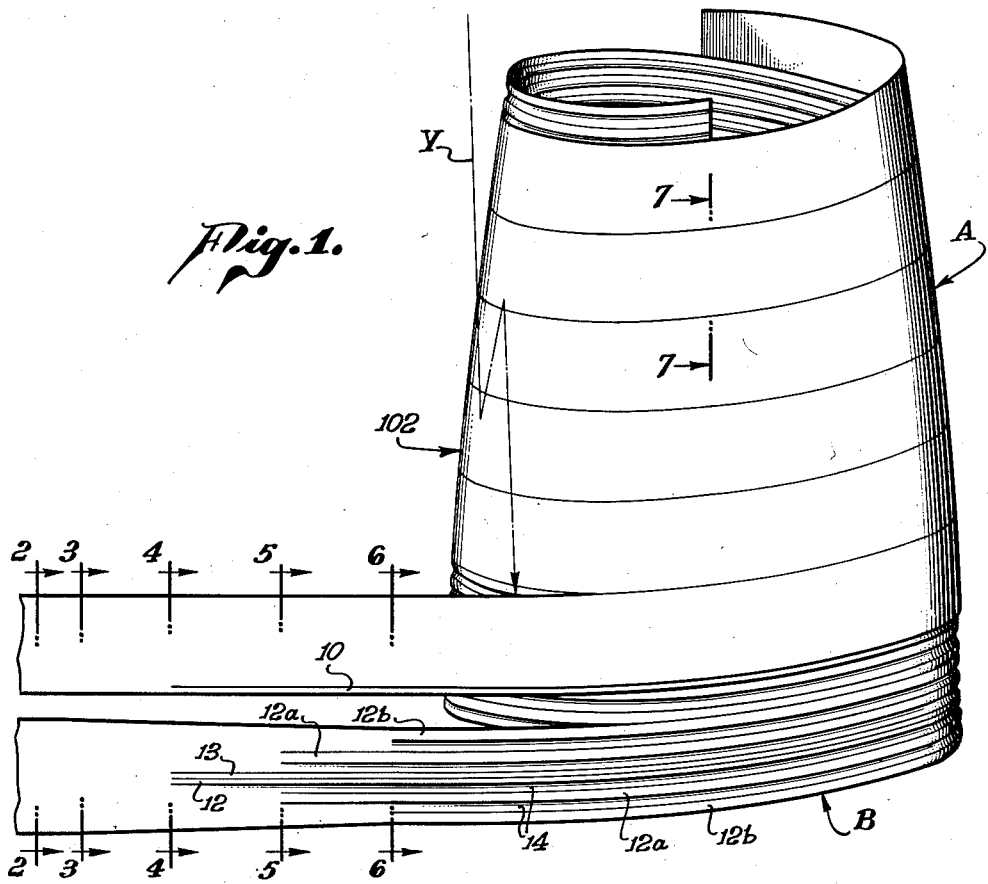
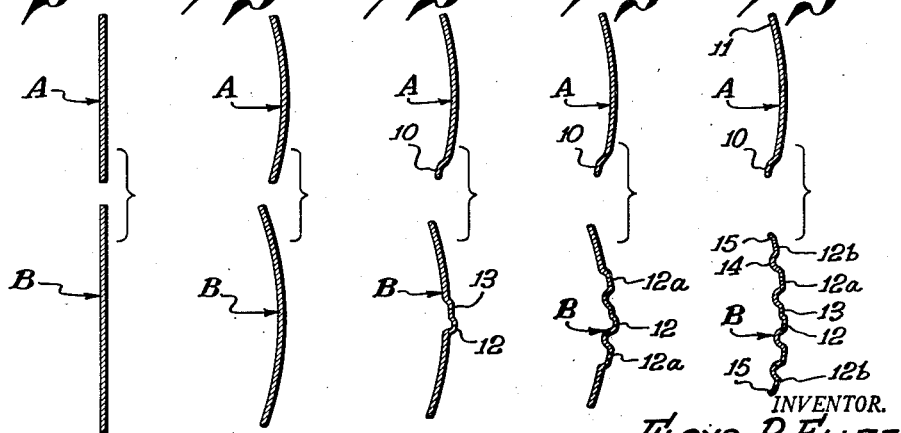
INVENTOR.
FLOYD P. ELLZEY,
BY
ATTORNEY.

March 26, 1957      F. P. ELLZEY      2,786,435
METHOD OF MAKING A SPIRALLY WRAPPED MULTI-LAYER TUBE
Original Filed June 24, 1946      4 Sheets-Sheet 2
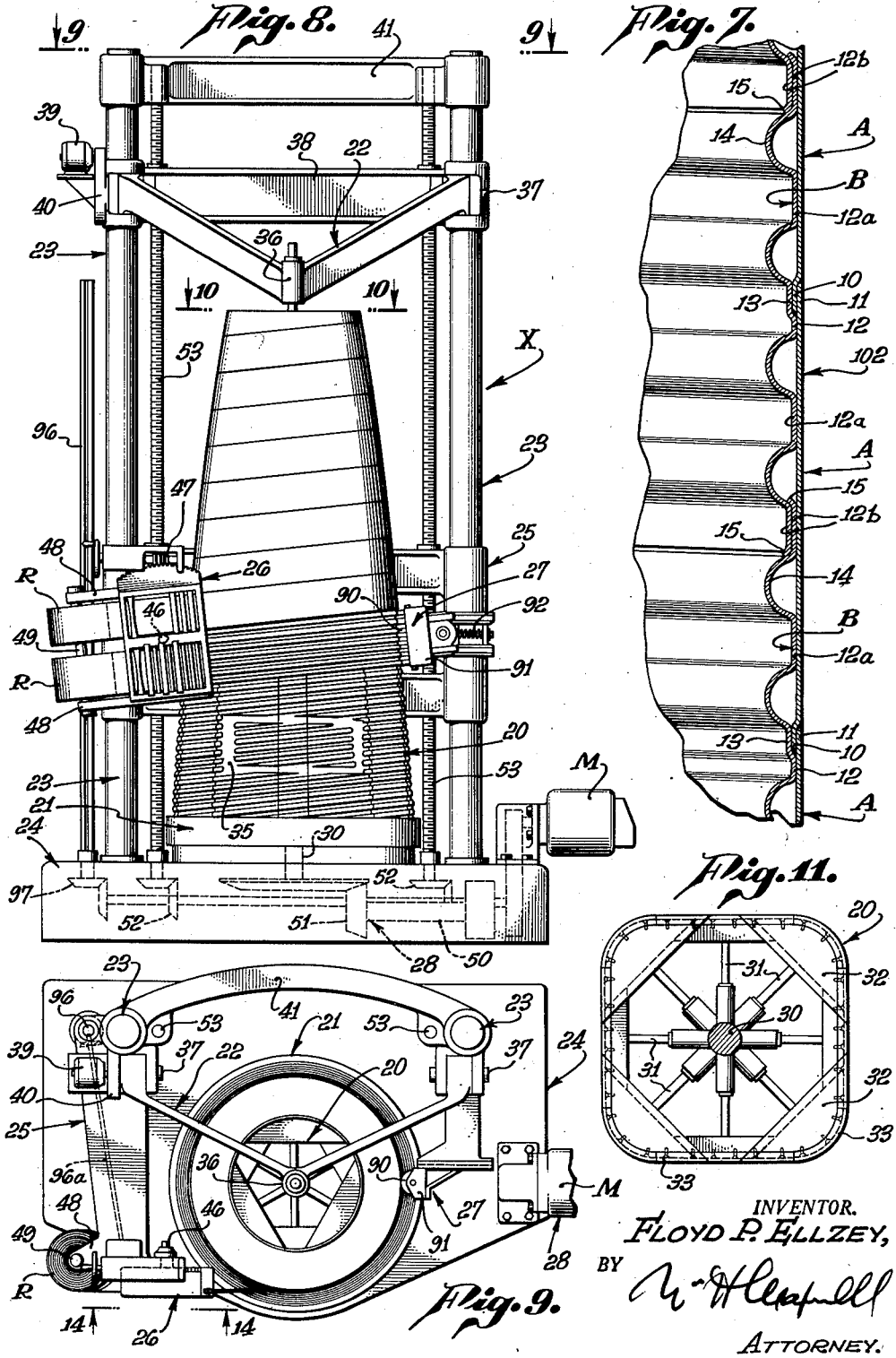
INVENTOR.
FLOYD P. ELLZEY,
BY
ATTORNEY.

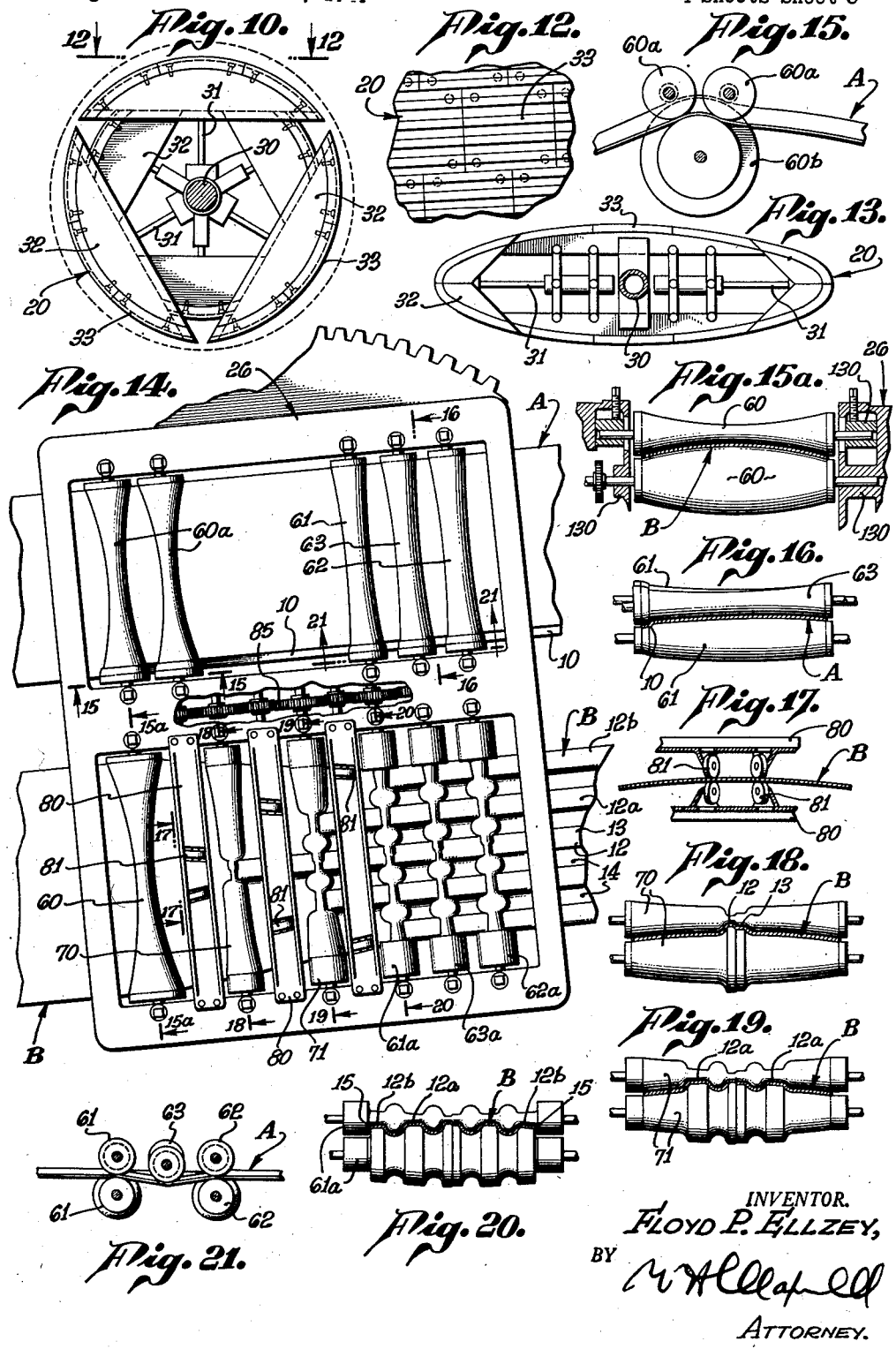

March 26, 1957   F. P. ELLZEY   2,786,435
METHOD OF MAKING A SPIRALLY WRAPPED MULTI-LAYER TUBE
Original Filed June 24, 1946   4 Sheets-Sheet 4
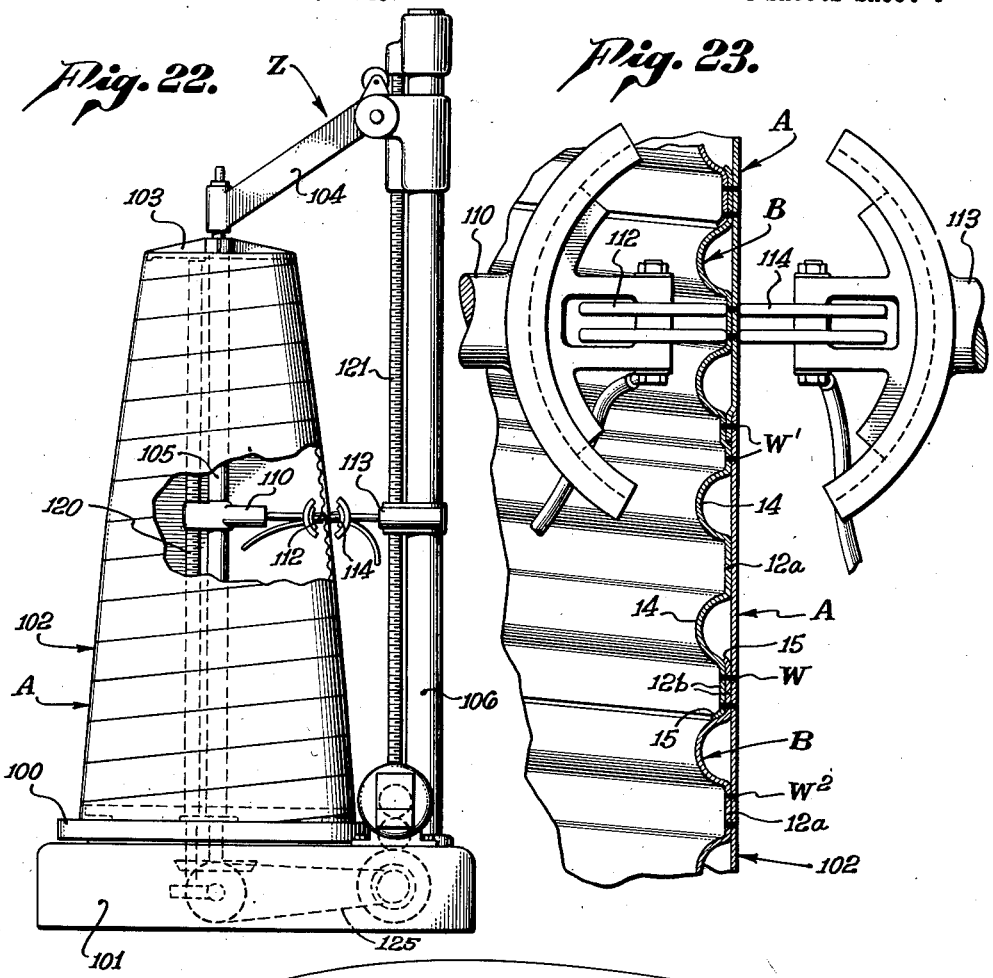
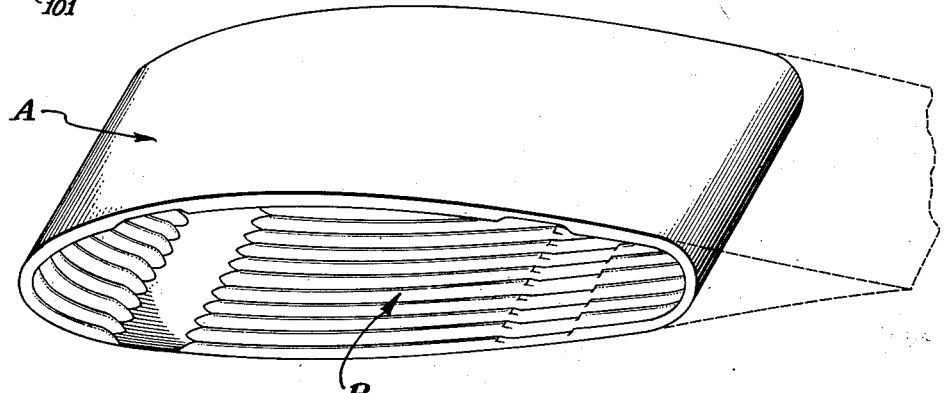
INVENTOR.
FLOYD P. ELLZEY,
BY
ATTORNEY.

United States Patent Office 2,786,435
Patented Mar. 26, 1957

2,786,435

METHOD OF MAKING A SPIRALLY WRAPPED MULTI-LAYER TUBE

Floyd P. Ellzey, Santa Monica, Calif.

Continuation of abandoned application Serial No. 678,768, June 24, 1946. This application June 1, 1953, Serial No. 358,797

6 Claims. (Cl. 113—116)

This invention relates to a method of making a spirally wrapped multi-layer tube, that is, a structure which is in the nature of a fabrication of sheet metal parts and it is a general object of my invention to provide a simple, practical, inexpensive means of forming or constructing various structures of sheet metal, or the like.

This application is filed as a continuation of my application entitled, "Method of Making Spirally Wrapped Multi-Layer Tube," filed June 24, 1946, Serial Number 678,768, now abandoned.

My present invention is concerned primarily with the handling or manipulation of sheet metal or materials to form fabricated structures and in accordance with the broader principles of my invention I contemplate handling various materials and I also contemplate forming a wide variety of structures. In general I may employ or handle any suitable sheet material. However, my invention is particularly suited for handling sheet metal such, for example, as sheet aluminum alloys, and the method that I provide can be employed to great advantage in handling metals or alloys which are subject to work hardening and which are therefore generally difficult to work or fabricate.

Further, in accordance with my invention I may form structures of various sizes, shapes and characters, for instance, I may provide round, cylindrical structures such as the bodies of tanks, or round tapered structures such as may form or enter into the fuselage of an airplane, or I may form structures suitable for wing sections of airplanes. In fact, in accordance with my present invention I can fabricate structures for a very wide range or uses such as vehicle bodies and therefore I do not wish the invention limited in any way to the specific form of construction that I will set forth, nor do I wish the invention limited to the formation of airplane parts even though I have, in the drawings, illustrated typical aircraft structures fabricated in accordance with my invention.

The desirability of using sheet metal in the construction of various objects or articles has long been recognized. However, the usual methods of manufacture heretofore available and the equipment available have made such structures or articles expensive and not always as strong or accurate as they might be. For example, sheet aluminum alloys or other similar light metal alloys have long been recognized as desirable for airplane parts such as the fuselages or wings of airplanes. However, such materials are generally subject to work hardening and require various forms of heat treating to the end that their fabrication or use has been limited to certain well known or common methods all of which have been more or less unsatisfactory and not altogether commercially practical.

It is a general object of my present invention to provide a simple, practical method of handling and acting upon sheet material, preferably sheet metal, to form and fabricate it into a practical permanent strong construction characterized in its finished form by inner and outer sheets, the inner sheet being a reinforcing or stiffening element while the outer sheet forms a smooth finished part.

It is another object of my present invention to provide a method of the character described capable of being carried out constinuously, making it advantageous to employ continuous lengths or strips of sheet material and to form structures which can be advantageously made in continuous, or in effect, integral units.

The various objects and features of my invention will be fully understood from the following detailed description of a typical manner of carrying out the method of my invention, throughout which description reference is made to the accompanying drawings, in which:

Fig. 1 is a view illustrating the manner in which the principal steps of my invention are carried out, being a view illustrating the formation of an elongate tubular tapered structure from two continuous strips of sheet material, which structure when finished has a corrugated inner sheet and a plain smooth outer sheet. Fig. 2 is a sectional view taken as indicated by line 2—2 on Fig. 1 illustrating the initial form or shape of the material that is handled. Figs. 3, 4, 5 and 6 are sectional views taken on lines 3—3, 4—4, 5—5 and 6—6, respectively, on Fig. 1, showing successive steps in carrying out the method of the present invention. Fig. 7 is an enlarged detailed sectional view through the finished construction that I have provided being a view taken as indicated by line 7—7 on Fig. 1. Fig. 8 is a front elevation of a unit of apparatus that I have provided showing it in process of forming a fabricated structure by the method of the present invention. Fig. 9 is a plan view of the apparatus being a view taken as indicated by line 9—9 on Fig. 8. Fig. 10 is a sectional view taken as indicated by line 10—10 on Fig. 8 illustrating a typical mandrel or core that I may use to carry out my invention. Fig. 11 is a sectional view of another form of core that may be employed in carrying out the invention. Fig. 12 is a side elevation of a part of the structure shown in Fig. 10, being a view taken substantially as indicated by line 12—12 on Fig. 10. Fig. 13 is a view similar to Figs. 10 and 11, showing another form of core that may be employed. Fig. 14 is an enlarged side elevation of a portion of the machine, being a view taken substantially as indicated by line 14—14 on Fig. 9, certain parts being broken away to show in section. Figs. 15 to 21, inclusive, are sectional views taken as indicated by lines 15—15, 15ª—15ª, 16—16, 17—17, 18—18, 19—19, 20—20, 21—21, respectively, on Fig. 14. Fig. 22 is a side elevation of a unit of apparatus that I have provided showing certain parts broken away to show in section. Fig. 23 is an enlarged detailed view of a portion of the structure shown in Fig. 22, and Fig. 24 is a perspective view of a portion of a structure suitable for aircraft wings made from the construction that I make by my present invention.

In accordance with the broader principles of my invention I handle a plurality of sheets of material which I will refer to as sheet metal, although I do not wish to be understood as thereby limited. I prefer, in carrying out my invention, to simultaneously handle or work upon two bodies of metal although the broader principles of the invention contemplate that any suitable number of parts or pieces of metal can be worked upon as circumstances require. In the following description I will refer to a form of my method wherein I work upon two pieces or bodies of sheet metal and I will, for example, refer to these pieces of metal as elongate strips or ribbons of metal. The said strips or ribbons of metal are designated in the drawings as A and B. In general, and by my method, I wrap the sheets or strips of metal A and B into an elongate tubular structure with one sheet forming the lining of the structure while the other sheet forms the exterior or skin of the structure. In the case illustrated the sheet A forms the skin of the structure while the sheet B forms the lining of the structure. I prefer to shape one of the strips so that it acts primarily as a stiffening or reinforceing element and ordinarily I prefer to locate this stiffening or reinforcing element inside of the other element or, in other words, I prefer to make the lining B the stiffening or reinforcing element.

In carrying out my invention I not only wrap the strips of sheet metal into an elongate tubular structure but I prefer to stagger or offset the wrapping of the two strips to stagger or offset the joints or seams that occur at adjacent parts of the strips. I preferably wrap each strip so that it is generally spiralled or helical in form, and I relate the turns or convolutions so that the edge portions of each strip adjoin, in fact, preferably overlap slightly as I have shown throughout the drawings. I contemplate fixing the adjoining or overlapping parts of each strip together by establishing a seam or joint so that each strip, in and of itself, is in the nature of a complete rigid or permanently formed spiralled structure of the desired cross sectional configuration.

Further, in carrying out my invention I prefer to stagger or longitudinally offset the joints of the two sheets so that they do not coincide but rather occur at different points lengthwise of the structure, to the end that there is no point in the structure where a joint is formed from the inside to the outside thereof. Furthermore, it is preferred that where the edges of each strip are joined, that is, along the seam of each strip, the said joint or seam is secured or joined to the overlying or adjoining portion of another strip, to the end that the two strips are joined together along the seams of the strips, with the result that the assembled structure is a permanent integral and, in effect, continuous structure.

Further, in accordance with my invention I preferably wrap the strips into tubular form and to assure tight fitting or adjoining of the overlapping parts of the strips I initially crown each strip, as shown in Fig. 3 of the drawings, so that as the strips are wrapped into cylindrical form the slight crown established in them is flattened somewhat to the end that the edges have a tendency to bear in or toward the center of the structure establishing tight bearing engagement at that point. Furthermore, where I form one strip such as the strip B as a stiffening element in the finished structure, I preferably corrugate it throughout its width and lengthwise so that it is continuously corrugated as will appear from an examination of the drawings.

A feature of my method is that I may initially form or shape each strip before wrapping it into the finished form mainly, if not entirely, by bending rather than stretching so that the metal thickness is effected a minimum amount. For instance, in the crowning operation I preferably merely bend the sheet into the desired curved or crowned cross section and if, as I have shown in the case of the sheet A, I provide an offset edge portion at one edge of the sheet to facilitate formation of a flush joint, I prefer to do this by bending rather than by stretching the material of the sheet and I thereby avoid work hardening. In the case of corrugating the stiffening sheet or the sheet B which I have shown as establishing the lining of the finished structure I prefer to form the corrugations by establishing bends in the sheet and as a consequence of bending the sheet into the desired corrugated form rather than stretching it into this form the sheet, which is initially of a width such as is shown in Figs. 2 and 3, progressively contracts or diminishes in width as the corrugations are established, until it is finally of a narrow finished form such as is shown in Fig. 6. In view of this circumstance I prefer to start initially with a sheet A that is narrower than the sheet B so that by the time the two sheets are both formed and ready for wrapping into the finished structure they are of substantially equal width and consequently will wrap into the finished structure with the seams maintained in the desired offset or overlapping relation.

Referring more specifically to the sheet A that I have shown in the drawings and which I provide to establish the skin of the finished structure, I prefer to start with a flat sheet such as is shown in Fig. 2 of the drawings and which may be taken from a roll R. This sheet is first bent into the crowned form such as is indicated in Fig. 3 of the drawings, it being understood that in practice a very slight amount of crowning is all that is necessary. Next, or simultaneous with the crowning of the sheet A I bend the edge 10 to offset it slightly, in fact, to offset it an amount equal to the thickness of the sheet A so that as the sheet A is wrapped with its edges overlapping the edge portion 11 overlaps or nests with the offset edge portion 10 as clearly shown in Fig. 7 of the drawings.

In the case of the sheet B I prefer to start with this wide sheet in flat form as shown in Fig. 2 and first crown it to the desired degree. The first or initial corrugating operation is performed on the sheet to establish an upstanding ridge 12 lengthwise of the sheet and preferably at the center of the sheet. In forming the ridge 12 I prefer to shape or bend the crest of the ridge so that it has a slightly depressed or indented land 13 for the reception of the inwardly bent edge portion 10 of sheet A as clearly shown in Fig. 7 of the drawings. By establishing the ridge 12 through bending rather than drawing of the metal the sheet is made somewhat more narrow than it was initially as will appear from an examination of Figs. 3 and 4 of the drawings. The second or a successive operation in the corrugating of the sheet may be the provision of one or more upstanding ridges $12^a$ in or on the sheet parallel with ridge 12. In carrying out my invention I prefer to simultaneously form two ridges $12^a$, one spaced at each side of the central ridge 12 and I prefer to shape each ridge $12^a$ so that it has a flat top or crest forming a land or bearing surface against which the inner side of sheet A may bear, as shown in Fig. 7 of the drawings. In the process of bending the sheet to establish the ridges $12^a$ the sheet is further narrowed from the condition shown in Fig. 4 to that shown in Fig. 5. In the particular form of the invention illustrated in the drawings a third and last corrugating operation is performed by providing marginal or edge ridges $12^b$ parallel with the ridges 12 and $12^a$, which ridges $12^b$ occur at or close to the edges of the sheet B and are preferably proportioned so that each ridge $12^b$ has a flat top or land joined with the adjoining ridge $12^a$ by a curved valley portion 14 and terminating at a slightly inturned lip portion 15. The ridges $12^b$ are preferably made slightly different from one another, that is, one of them is not quite as high nor as wide as the other, to the end that they will nest together or lap one over the other to form an overlapping seam or joint as the strip B is wrapped into spiral form. This fitting or lapping of the ridges $12^b$ is clearly illustrated in Fig. 7 of the drawings.

It is to be observed that I form the several ridges or corrugations in the strip B so that when the strip B is finally wrapped into final form, as shown in Figs. 1 and 7 the tops or lands of the several ridges lie in a common plane and form a seat or rest against which the outer or skin sheet A bears.

In the final operation of my method I permanently join the overlapping edges of the sheets A and B and I preferably join the sheets themselves to the end that the sheets are fixed together in the wrapped spiral form and are fixed together one forming the reinforcement and the other the finished skin of the final structure. I may separately or independently join the overlapping edges of sheets A and B and independently join the sheets together, although I prefer, in practice, to establish these connections in one single, continuous operation, preferably a welding operation, in a manner which I have illustrated in Fig. 23 of the drawings. In the case illustrated welds W are established joining the overlapping ribs 12$^b$ of sheet B and also joining the overlying portions of sheet A to the overlying ribs 12$^b$. The weld W may be a continuous weld or it may be of the type commonly referred to as a spot weld, in which case the points of weld W occur at spaced intervals along the joined parts. Further welds W' join the overlapping edge portions of sheet A and join these portions of sheet A to the rib 12 of sheet B. In addition to the welds referred to further welds W$^2$ may be provided if desired at points where there are no joints between the edges of the sheets but simply where the sheets overlap as for instance where sheet A bears on or overlaps ribs 12$^a$ of sheet B. It is to be understood that the welds may not only vary in character or be of different types but they may vary as to extent, for instance, in the drawings I have shown double lines of welds wherever welds occur, whereas in practice single lines may be employed or any number or pattern of welds may be employed. It is to be understood that other fastening or securing means, such as adhesives or the like may be used if desired.

In accordance with my method I contemplate primarily the formation of strips such as strips A and B into spirally wound bodies one overlying the other and joined into a solid or continuous integral structure. I contemplate that such a structure may be of any desired cross section within reasonable mechanical limits, for example, it may be round in cross section, as shown in Figs. 1 and 10 of the drawings, or it may be polygonal as shown in Fig. 11 of the drawings wherein I show a form that is square except that the corners are suitably rounded off or it may be elliptical in form, as shown in Fig. 13 of the drawings. Furthermore, the tubular structure that I form may be a straight uniform tubular structure, that is, a structure uniform in size or dimensions throughout its length, or it may vary in size at different points along its length. Such a condition is illustrated in Fig. 1 of the drawings where I show a body which is round in cross section and tapered lengthwise. When such a body is formed I stretch the sheets slightly prior to incorporation in the finished structure so that they lie flat or smooth in the finished structure which they would not do if merely formed as above described and rolled into a spiralled tapered form. By stretching the sheets I mean that I slightly stretch each sheet gradually between its edges, leaving the edge toward the small end of the tapered structure unstretched and giving the edge toward the large end of the finished structure a maximum amount of stretch. Such stretching needs to be but slight and is not enough to materially affect sheet material even of a type that is subject to work hardening, and it serves to deflect each strip from a straight elongate strip to a strip slightly curved edgewise so that it has a radius of curvature such as I have indicated by the arrow Y in Fig. 1.

A spirally formed tubular structure involving a plurality of individual sheets joined edge to edge, which sheets are in staggered or overlapping relation in the finished structure and which may vary in character so that one is corrugated to form a stiffening element while the other is plain to form a finished surface, may be employed in a number of ways to form a useful finished device or article of manufacture. In Fig. 24 of the drawings I have shown how a tubular structure formed in accordance with my invention may be formed into a wing element of an airplane. In this case an elongate tubular fabricated structure is initially formed on an elliptical core or mandrel such as is shown in Fig. 13 with the longitudinal corrugations of the inner sheet B flattened or interrupted where the caps or spars or other structural parts are to occur. A rear or trailing edge portion may be built to this wing section as indicated by dotted lines. This particular adaptation of the structure will serve to illustrate that it cannot only be used exactly as initially formed in accordance with my method, but that such structure may be supplemented as by stiffening or reinforcing elements and parts as circumstances may require.

The apparatus that I have provided, and which is to be the subject of a separate application, may be incorporated in various forms although I prefer, in practice, to make it in two units one of which I will refer to as a forming unit X and the other as a finishing unit Z. The forming unit X is illustrated, generally, in Figs. 8, 9, 10, 12 and 14 to 21 of the drawings. This unit involves, generally, a core or mandrel 20 onto which the strips of material are wrapped in accordance with my method, a rotatable carrier 21 for the core, a guide frame 22 supplementing the carrier 21 in the handling of the core 20, standards 23 projecting upwardly from a base 24 that carries the carriage 25, a reciprocating carriage 25 supported between standards 23, a head 26 mounted on the carriage 25 and carrying a plurality of rollers which act upon the strip or strips of material to initially bend or shape them in the required manner, pressure means 27 acting to assure tight engagement of the formed strips with the core, means 28 operating the rotatable carrier 21 and the reciprocating carriage 25 in synchronism, and various other parts the details of which will be hereinafter described.

The core or mandrel 20 that I employ in establishing any one form of my invention will, in practice, vary widely in form and details, depending upon the shape and details entering into the finished structure. In the form of the invention illustrated in Figs. 8, 9, 10 and 12 of the drawings I show a core round in cross section and suitable for handling a finished structure having a corrugated lining, and consequently the core is made collapsible. The collapsible core construction that I have shown involves, generally, a central or axial stem 30 carrying cylinders that support radially disposed arms or spokes 31 having segmental heads 32 at their outer ends. The heads 32 have their outer surfaces finished or equipped with suitable blocks or plates 33. The several plates entering into or forming the body of the core around which the strips are wrapped overlap in a manner such as is shown in Fig. 12, and the heads fit together so that certain of them can be withdrawn as shown in Fig. 10, allowing the core to contract, or the heads can be extended causing the core to be expanded and held in place by suitable locking devices. In Fig. 10 of the drawings certain of the heads are withdrawn allowing the core structure to be collapsed or contracted and it will be apparent from this figure of the drawings how the several heads can be expanded or moved out until the several heads 32 and their plates 33 register or coincide to form a continuous round surface about which the strips of material can be wrapped. In the case where corrugations are provided in the core to fit or correspond to corrugations of the sheet that bears directly on the core, the plates 33 are ribbed or corrugated as shown in the drawings. The plates 33 are readily removed and replaced so as to easily and quickly modify the mandrel or core as to doors, windows and other openings.

Where it is desired that the finished structure be provided with interruptions in the corrugations, as for instance, with flattened parts where windows, doors or other openings may be formed in the finished structure, I may interrupt the corrugations in the core as shown at 35 in Fig. 8. Where such panels or doors occur the portion of the structure that is removed may be removed by a suitable cutting operation, and the panel may be provided with suitable hardware to be used to cover the opening that it is removed from. When eliminating corrugations at points such as 35 in Fig. 8 the pressure means 27 cooperates with the core in flattening or ironing out corrugations initially established in the strip B and by locating the parts 35 at the desired points in or along the core I am able to obtain any desired interruption of the corrugated formation of strip B.

The rotating carrier or table 21 supports and rotates the core or mandrel 20 through driving engagement with the stem 30 and in the preferred arrangement the table 21 is horizontally disposed and is mounted on a vertical axis so that the core is supported on a vertical axis. In this case the entire machine or unit X that I am describing may be said to be a vertical machine. However, it will be apparent that I may, in carrying out my invention, arrange the parts at any suitable angle, for instance, they may well be arranged so that the machine is of the horizontal type in which case the axis of the core will be horizontally disposed instead of vertically disposed, as shown in the drawings.

The guide frame 22 that supplements the rotating carrier or table 21 in supporting the core or mandrel 20 preferably includes a frame-like structure having a bearing 36 which rotatably supports the upper end of the core stem 30. The frame carrying the bearing 36 is pivotally carried on pins 37 supported by a cross arm 38 that extends horizontally between the standards 23. The pins 37 are on a common horizontal axis, and the arm 38 may be lifted to move the bearing 36 out of engagement with the stem whereupon the frame 22 can be swung up out of the way allowing the core to be manipulated or handled relative to the table 21 as circumstances may require.

In a large machine I may provide a power means for swinging the frame 22, for instance, I may provide a suitable motor 39 connected with the frame 22 through a suitable drive 40.

The standards 23 which may vary in number and arrangement as circumstances require preferably extend from the base 24 to be parallel with the core 20 when it is supported in the machine. In the case illustrated I have shown two standards 23 extending upwardly from the base 24 and tied together at their upper ends by a tie member 41. The reciprocating carriage 25 is in the nature of a cross head or slide supported by the standards 23 to move lengthwise thereof and it serves as a mounting or support for the head 26.

The head 26 is a cage-like frame structure pivotally mounted on the carriage 25 on a horizontal axis as, for instance, on a pivot pin 46 so that it can be tilted to a suitable angle such as is shown in Figs. 8 and 14. A suitable gear mechanism 47 is provided for adjusting and holding the head in the desired angular position relative to the carriage and consequently relative to the core on which the strips of material are wrapped. A suitable drive 96$^a$ is provided between the shaft 96, hereinafter described, and the gear mechanism 47 so that the head may be progressively adjusted as the machine operates when this adjustment is necessary. The head 26 has spaced arms 48 which support pins 49 carrying rolls R of strip material which is to be passed through the head and onto the core. In the general operation of the machine the leading or starting ends of the strips A and B are fixed to the core, for instance, in the case illustrated in Fig. 8 to the small end portion of the core, and the head 26 is set at the desired angle through the gear 47, whereupon the core is rotated so that the strip material from the rolls R is wound or drawn onto the core from the rolls R and in reaching the core passes through the structure supported by the head 26. By winding the strips of material onto the core with suitable drag or tension the strips are drawn tight onto the core bringing their wrapped edges into tight bearing engagement and bringing one strip into tight bearing engagement with the other. In the preferred form of my invention I employ means to synchronize the motion of the core 20 with the carriage 25 or, in other words, I synchronize rotation of the table 21 with linear movement of carriage 25 to the end that the strips A and B are advanced lengthwise of the core at the proper rate as the core revolves or is turned.

In the case illustrated I show a source of power or prime mover M which drives a main shaft 50. The shaft 50 acts through suitable gears 51 to rotate the table 21 and it acts through suitable gears 52 and screws 53 to move the carriage 25 lengthwise of the standards 23. It will be understood how the parts just described can be related so that the desired synchronism is gained between the rotation of the table 21 and the linear movement of carriage 25.

The head 26 carries a set of rollers acting primarily to bend each sheet or strip of material in the desired manner. Where there are two strips of material being handled the head carries primarily two or more sets of rollers and where the machine is a vertically disposed structure, as shown in the drawings, I provide what I will term an upper set of rollers to handle the uppermost sheet which in this case is the skin or outer sheet A and a lowermost set of rollers provided to handle the innermost sheet or liner strip B. It is to be understood that two or more upper sets of rollers and two or more lower sets of rollers may be used if desired. Where the innermost sheet or strip B is merely to be slightly crowned transversely it is generally necessary to establish a single pair of rollers for acting on the inner strip B. In the case illustrated I show cooperating or meshing rollers 60 suitably supported in bearings 130 carried by head 26 so that as the strip B passes between them it is bent into a crowned cross section. Where the skin or outer strip A is to be slightly crowned transversely and longitudinally, or crowned in two planes, and provided with an offset edge portion 10 to establish a suitable joint, it is generally necessary to establish a pair of small concave rollers 60$^a$ acting against a large convex roller 60$^b$. As the sheet or strip A passes through the rollers 60$^a$ and 60$^b$ the sheet is crowned both transversely and longitudinally and is provided at its lower edge with the offset edge portion 10.

Where the strip A is to be formed into a tapered structure or a structure characterized by a longitudinally curved contour as shown in Fig. 8 of the drawings, I provide rollers which serve to slightly stretch strip A in the desired manner or from its upper edge to its lower edge, stretching it progressively between the two edges so that it is stretched a minimum amount at its upper edge and a maximum amount at its lower edge or where the offset part 10 occurs. In the case illustrated I provide two pairs of rollers 61 and 62 to effectively hold the strip A, and I provide a roller 63 located between the rollers 61 and 62 to effect stretching of the sheet A. The roller 63 is preferably arranged so that it is in perfect alignment at one edge of the strip as for instance at the upper edge where the strip is not to be stretched, but is suitably offset at the other edge where the strip is to be stretched. For instance, as shown in Figs. 16 and 21, the center roller 63 can be offset laterally or, say, inwardly at the edge of the strip A adjacent portion 10 causing the desired stretch in the strip as it passes by or under the roller. In the drawings I have shown the crowning operation preceding the stretching operation which sequence I may reverse if I so desire.

In the case of the rollers provided to act on the strip B I provide the pair of rollers 60 which serve to give the strip B the desired crown and I may provide pairs of rollers 61$^a$, 62$^a$ and a roller 63$^a$ which act like rollers 61, 62 and 63 to give the strip B the desired stretch progressing from its upper edge to its lower edge where the stretch is maximum.

The primary reason for crowning the sheet B is to prevent wrinkling during the corrugating operation that I will hereinafter describe, the crown in the sheet B giving the sheet a natural tendency to form upward into the corrugated cross section that I provide.

The rollers acting on strip B further include sets or pairs of rollers which serve to establish the desired ribs or corrugations in strip B giving the strip B the desired corrugated cross sectional configuration. For this purpose I provide what I will term a first pair of corrugating rollers 70 which cooperate to bend the sheet B in a manner to establish a rib or ridge 12 therein, and a second pair of rollers 71 which cooperate to bend the sheet B in a manner to establish the ribs 12ª at each side of rib 12. A third set of rollers can be employed to establish the ribs 12ᵇ that I have described above or I may, as I have shown in the drawings, form rollers 61ª in a manner so that they act not only as a part of the stretching means but also to bend the strip B in order to establish the ribs 12ᵇ.

In the preferred form of my invention bridge members 80 are provided on the head 26 immediately ahead of each set of rollers acting to establish a rib or ribs in the sheet B and bending or tucking rollers 81 are carried by the bridges to bend or tuck the material of sheet B as it approaches the forming or bending rollers to the end that the sheet B is bent into the desired cross section in a most advantageous manner. The manner in which the rollers 81 cooperate with the pairs of main rollers will be clearly understood from an examination of Figs. 14 and 17 of the drawings.

In carrying out my invention I may merely pass the strips of material A and B through the head 26 and consequently through the rollers of the head or, as I prefer, I may drive the rollers or at least the various rollers of each set together by gears 85 so that there is not an excessive drag at any one point on the material. In the apparatus that I have provided I have a splined drive shaft 96 extending parallel to the standards 23 adjacent the head 26 and driven by gears 97 to operate in synchronism with the core or mandrel 20 and carriage 25. The shaft 96 is provided with a driving member that can be suitably coupled to the gear train 85, if desired. If light, fragile material is employed a power drive may be provided for operating the rollers at the desired speed or in synchronism with the rotation of the core, whereas if a more substantial material is being used I can eliminate even the gear connections 85 and merely let the sheets drag through the rollers.

The pressure means 27 that I have provided preferably acts on one or both of the strips of material and serves to press it firmly into engagement with the core. In the particular case illustrated that is, where I provide a corrugated liner sheet or strip B, it is advantageous to provide pressure means 27 for pressing the strip B into tight seating engagement with the core 20, whereas where the outer sheet is a plain smooth sheet it is ordinarily unnecessary to provide pressure means such as 27. In some instances it may be desirable to only partially form the sheet B in the head 26, say for instance 75 percent, and to finish forming the sheet by pressing it against the core with the rollers 90 or by stretching, say for instance 25 percent, in which operation the metal may be work hardened. I may in other instances completely form the corrugations with the rollers 90. The pressure means 27, as shown, involves pressure rollers 90 the face or periphery of which correspond to the contour of the corrugated strip B, and a frame 91 carrying the rollers 90 and pressed by a spring 92 to normally yieldingly press the rollers against the core at a point where the strip B has been wrapped or applied onto the core. The means 27 is carried by the carriage 25 to progress lengthwise of the core as the machine operates, and consequently it remains in proper mesh with the strip B as this strip is fed onto the core and serves not only as a means for pressing the strip onto the core but for maintaining proper mesh of the strip B with the core.

The unit Z of the apparatus that I have provided is adapted to handle the structure formed on the core or mandrel 20 or, in other words, an assembly of strips A and B that have been wrapped together in the manner hereinabove described and temporarily clamped, spotted, or otherwise secured together enough to facilitate handling. In its preferred form the unit Z involves a rotating platform or table 100 mounted on a base 101. The platform is adapted to support the wrapped structure 102 formed as I have described above. A top guideplate 103 may be provided to engage the upper end of the structure and a frame 104 similar to frame 22 may be provided to guide a central post 105 that projects upwardly from the platform and which carries the plate 103. A standard 106 extends upwardly from the base 101 offset from the post 105 to be at the exterior of the wrapped structure 102 so that the unit Z, in effect, provides parallel parts, the post 105 and the standard 106 inside, outside and parallel to the structure 102 as shown in Fig. 22 of the drawings. The unit Z further includes means for establishing the desired joints or connections between the edges of overlapping parts of the strips A and B that enter into the structure 102. In the preferred form of the invention I provide a welding means for making welded connections or welds W, W' and W² as I have hereinabove described. In the case illustrated a suitable bracket structure 110 is carried by post 105 to carry one or more welding electrodes 112 and a bracket structure 113 is carried by the standard 106 to carry corresponding or opposite electrodes 114. It is to be understood that the brackets 110 and 113 may be provided with suitable means for adjustment and are such that the electrodes can be arranged in the desired opposed relation or at the desired angles relative to the structure 102. I provide means for operating the brackets 110 and 113 in synchronism and in synchronism with the rotatable platform 100 so that as the platform 100 is turned the brackets 110 and 113 carry the electrodes lengthwise of the structure 102 maintaining them at the desired seam or joint of the structure 102. In the case illustrated screws 120 and 121 engage and operate the brackets 110 and 113 respectively and the screws are geared together and driven by suitable means 125 provided in the base 110.

From the foregoing description it will be apparent that I have, by my method, provided for bending longitudinal strips of metal or the like in a manner to facilitate their being spirally wrapped into tubular form with their edges adjoining or overlapping and so that one strip overlaps the other separating the joints of the two strips and that I have provided for effectively and practically securing the joints or seams of the wrapped structure so that I provide a final structure which is permanent in character, rigid, and which may be designed and proportioned so as to be very light and strong, making it suitable for use in airplane construction or for being worked into an airplane wing in the manner shown in Fig. 24 of the drawings.

Further it will be apparent that the apparatus that I have provided is simple in character and that it is such that it can be made to operate smoothly and accurately to the end that it produces structures which are uniform and accurate.

Having described only a typical preferred manner of carrying out the method of my invention, I do not wish to be limited or restricted to the specific details herein set forth, but wish to reserve to myself any variations or modifications that may appear to those skilled in the art and fall within the scope of the following claims.

Having described my invention, I claim:

1. The method which involves forming a plurality of flat strips of metal into a rigid tubular structure having a corrugated reinforcing inner element and a smooth outer element, and having an opening in the side thereof with inside and outside flat marginal portions, forming an inner element by first bending a plurality of longitudinal corrugations in a first strip and wrapping said strip helically in tightly lapped engagement, flattening the corrugations where the inner marginal portions of the opening are to occur, then forming an outer element by wrapping a second strip helically over the first strip in tightly lapped engagement, then establishing a structure by securing the edge portion of each strip together and securing the inner element to the outer element where adjacent convolutions of the strips overlap, and establishing the opening in the side of the structure by cutting through the two elements at said marginal portions where the inner element is flattened.

2. The method which involves forming a plurality of flat strips of metal into a rigid tubular structure having a corrugated reinforcing inner element and a smooth outer element, and having an opening in the side thereof with inside and outside flat marginal portions, forming an inner element by first bending a plurality of longitudinal corrugations in a first strip and wrapping said strip helically with the edges thereof occurring between adjacent convolutions in tightly lapped engagement, flattening the corrugations where the inner marginal portions of the opening are to occur, then forming an outer element by bending an offset in one edge portion of a second strip to establish a recess and wrapping said second strip helically over the first strip with the recessed edge portion in tightly lapped engagement with the other edge of said second strip between adjacent convolutions of the second strip and with the joints between the edges of the inner and outer strips spaced apart longitudinally of the structure formed by the strips, then securing the edge portions of each strip together and securing the inner element to the outer element where adjacent convolutions of the strips overlap, and establishing the opening in the side of the structure formed by the strips by cutting through the two elements at said marginal portions where the inner element is flattened.

3. The method which involves forming a plurality of flat strips of metal into a substantially rigid tubular structure having a reinforcing inner element and a smooth outer element by first crowning each strip slightly in cross section from one edge to the other and in the same direction, then forming an inner element by bending a plurality of longitudinal flat-topped corrugations in a first strip, and forming a lengthwise extending recess in the top of one of the corrugations intermediate the edges of said strip, and wrapping said first strip helically with the edge portions thereof occurring between adjacent convolutions joined in tightly lapped engagement, then forming an outer element by bending an offset in one edge portion of a second strip to establish a continuous lengthwise extending recess and wrapping said second strip helically over the first strip with the recessed edge portion of said second strip joined in tightly lapped engagement with the other edge of said second strip between adjacent convolutions of the second strip, the joint thus formed by the second strip resting in the recess in said first strip, and then fastening the strips together and securing the inner strip to the inner side of the outer strip at the outer strip joints.

4. The method which involves forming a plurality of flat strips of metal into a substantially rigid tapered tubular structure having a reinforcing inner element and a smooth outer element by first stretching each strip slightly edgewise in the same direction, then forming an inner element by crowning each strip slightly in cross section and in the same direction, and from one edge portion to the others, then bending a plurality of longitudinal flat-topped corrugations in a first strip, and forming a lengthwise extending recess in the top of one of the corrugations intermediate the edges of said strip, and wrapping said first strip helically with the edge portions thereof occurring between adjacent convolutions joined in tightly lapped engagement, then forming an outer element by bending an offset in one edge portion of a second strip to establish a continuous lengthwise extending recess and wrapping said second strip helically over the first strip with the recessed edge portion of said second strip joined in tightly lapped engagement with the other edge of said second strip between adjacent convolutions of the second strip, the joint thus formed resting in the recess in said first strip, and then fastening the strips together by securing the inner strip to the outer strip at the outer strip joints.

5. The method which involves forming a plurality of flat strips of metal into a substantially rigid tubular structure having a reinforcing inner element and a smooth outer element by first crowning each strip slightly in cross section from one edge to the other and in the same direction, then forming an inner element by bending a plurality of longitudinal flat-topped corrugations in a first strip, and forming a lengthwise extending recess in the top of one of the corrugations intermediate the edges of said strip, and wrapping said first strip helically with the edge portions thereof occurring between adjacent convolutions joined in tightly lapped engagement, then forming an outer element by bending an offset in one edge portion of a second strip to establish a continuous lengthwise extending recess and wrapping said second strip helically over the first strip with the recessed edge portion of said second strip joined in tightly lapped engagement with the other edge of said second strip between adjacent convolutions of the second strip, the joint thus formed by the second strip resting in the recess in said first strip with the inner strip joints and the outer strip joints spaced apart in alternate relation longitudinally of the structure, and then fastening the strips together and securing the inner strip to the inner side of the outer strip at the outer strip joints.

6. The method which involves forming a plurality of flat strips of metal into a substantially rigid tubular structure having a reinforcing inner element and a smooth outer element by first crowning each strip slightly in cross section from one edge to the other and in the same direction, then forming an inner element by bending a plurality of longitudinal flat-topped corrugations in a first strip, and forming a lengthwise extending recess in the top of one of the corrugations intermediate the edges of said strip, and wrapping said first strip helically with the edge portions thereof occurring between adjacent convolutions joined in tightly lapped engagement, then forming an outer element by bending an offset in one edge portion of a second strip to establish a continuous lengthwise extending recess and wrapping said second strip helically over the first strip with the recessed edge portion of said second strip joined in tightly lapped engagement with the other edge of said second strip between adjacent convolutions of the second strip, the joint thus formed by the second strip resting in the recess in said first strip with the inner strip joints and the outer strip joints spaced apart in alternate relation longitudinally of the structure, and then fastening the strips together and securing the inner strip to the inner side of the outer strip at both the outer and inner strip joints.

References Cited in the file of this patent

UNITED STATES PATENTS

| | | |
|---|---|---|
| 919,001 | Greenfield | Apr. 20, 1909 |
| 1,159,798 | Reynders | Nov. 9, 1915 |
| 1,580,760 | Palmer | Apr. 13, 1926 |
| 1,659,792 | Thorsby | Feb. 21, 1928 |
| 2,007,970 | Hartley | July 16, 1935 |
| 2,008,423 | Ritchie | July 16, 1935 |
| 2,155,859 | Harford | Apr. 25, 1939 |
| 2,351,152 | Schick | June 13, 1944 |